(12) United States Patent
Sisson

(10) Patent No.: US 8,862,602 B1
(45) Date of Patent: Oct. 14, 2014

(54) SYSTEMS AND METHODS FOR IMPROVED READABILITY OF URLS

(75) Inventor: David Philip Sisson, Fremont, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/281,144

(22) Filed: Oct. 25, 2011

(51) Int. Cl.
*G06F 7/00* (2006.01)
*G06F 17/30* (2006.01)

(52) U.S. Cl.
USPC .......................................... 707/756

(58) Field of Classification Search
USPC ................................ 707/755, 756
See application file for complete search history.

(56) References Cited

U.S. PATENT DOCUMENTS

| | | | |
|---|---|---|---|
| 2004/0032415 A1* | 2/2004 | Rimas et al. | 345/619 |
| 2006/0080081 A1* | 4/2006 | Menninga | 704/4 |
| 2006/0112142 A1* | 5/2006 | Sako et al. | 707/104.1 |
| 2006/0136478 A1* | 6/2006 | Berkner | 707/102 |
| 2010/0169300 A1* | 7/2010 | Liu et al. | 707/709 |
| 2011/0258535 A1* | 10/2011 | Adler et al. | 715/235 |
| 2012/0239667 A1* | 9/2012 | Vysyaraju et al. | 707/749 |

* cited by examiner

*Primary Examiner* — Khanh Pham
*Assistant Examiner* — Van Oberly
(74) *Attorney, Agent, or Firm* — Foley and Lardner LLP; John D. Lanza

(57) ABSTRACT

Methods and systems for improved readability of URLS includes receiving a query requesting a universal resource locators relating to the query; parsing the query based on parsing criteria to determine keywords for the query; identifying a plurality of words in the universal resource locator; inserting space between at least two of the plurality of words; and generating display data comprising the result having the plurality of words and the inserted space therebetween.

22 Claims, 3 Drawing Sheets

SYSTEMS AND METHODS FOR IMPROVED READABILITY OF URLS

BACKGROUND

The present disclosure relates generally to locating pages and files on the Internet, and more particularly, to improving readability of universal resource locators (URL).

In one example, a user inputs a search query to a search engine. The search engine selects search results or one or more advertisements relating to the keywords of the search query. When the search results or advertisements are displayed, URLs may be displayed within the text or image of the search results or advertisement and may comprise a link to a web site associated with the search results or advertisement.

SUMMARY

Implementations of the systems and methods for improving the readability of URLs are described herein. One implementation is a system including a server computer configured to receive a query requesting a universal resource locators relating to the query. The system may further include a parsing logic configured to parse the query based on parsing criteria to determine keywords for the query. The system may also include the server computer configured to identify a plurality of words in the universal resource locator, to insert space between at least two of the plurality of words, and to generate display data comprising the result having the plurality of words and the inserted space therebetween.

Another implementation is a method that includes receiving a query requesting a universal resource locators relating to the query. The method also includes parsing the query based on parsing criteria to determine keywords for the query. The method further includes identifying a plurality of words in the universal resource locator. The method also includes inserting space between at least two of the plurality of words. The method includes generating display data comprising a result having the plurality of words and the inserted space therebetween.

These implementations are mentioned not to limit or define the scope of the disclosure, but to provide an example of an implementation of the disclosure to aid in understanding thereof. Particular implementations can be developed to realize one or more of the following advantages.

The details of one or more implementations of the disclosure are set forth in the accompanying drawings and the description below. Other features, aspects, and advantages of the disclosure will become apparent from the description, the drawings, and the claims.

BRIEF DESCRIPTION OF THE DRAWINGS

The details of one or more implementations of the disclosure are set forth in the accompanying drawings and the description below. Other features, aspects, and advantages of the disclosure will become apparent from the description, the drawings, and the claims.

DETAILED DESCRIPTION

According to some implementations, a more readable URL, which is also selectable URL (e.g., using cut/paste, copy/paste, etc.), may be provided to enhance web experiences by making it easier for a user to recognize the relevance of a search result and/or increase the click-through rate of an advertisement. According to some implementations, the URL can improve content readability, provide more flexibility and control in presenting information and reduce the complexity of the content. According to other implementations, the URL may be useful for screen readers, such as those implemented by the visually impaired.

Figure 1:
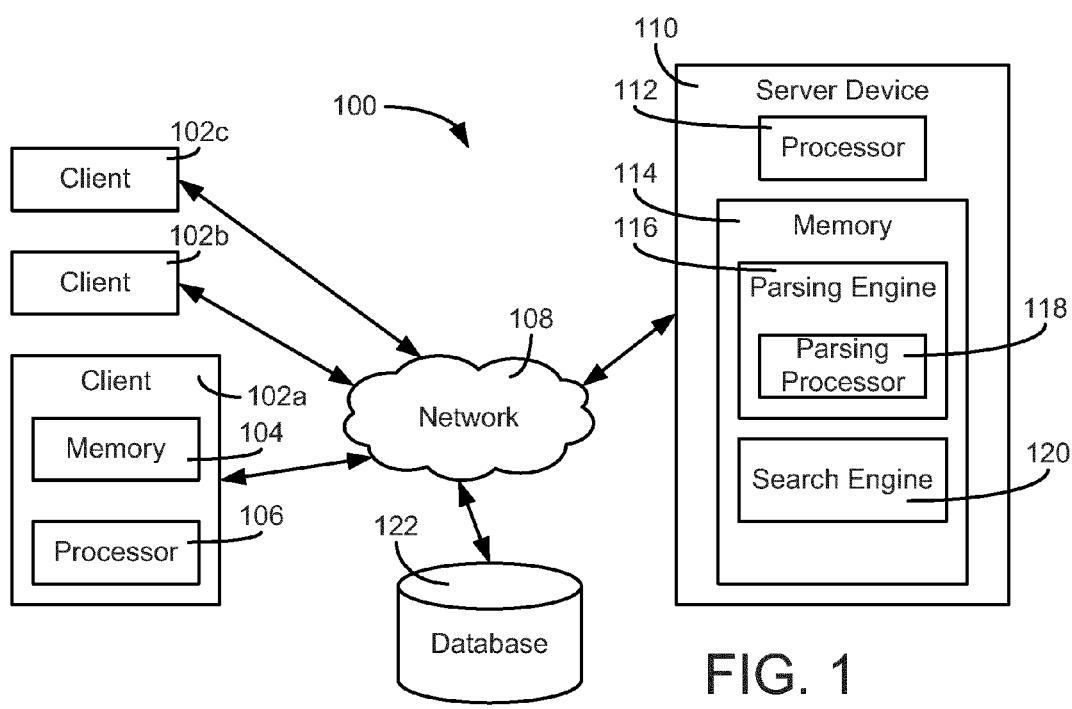
FIG. 1 is a block diagram of a system in accordance with a described implementation.

Referring to FIG. 1, a block diagram of a system in accordance with a described implementation is shown. The system 100 shown in FIG. 1 includes multiple clients 102a-102c in communication with the server 110 over a network 108. In some implementations, there are multiple servers that perform the functions of the single server in FIG. 1. The network shown includes the Internet. In other implementations, other networks, such as a WAN, LAN, or intranet may be used. In some implementations, the system and methods may operate within a single server. In a brief overview, the clients 102a-c and the server 110 may be remote from each other. The relationship of client 102a-c and server 110 arise by virtue of programs running on the respective device and having a client-server relationship to each other. In some implementations, the server 110 provides data (e.g., an HTML page) to the clients 102a-c (e.g., for purposes of displaying data to and receiving user input from a user interacting with the client). Data generated at the clients 102a-c (e.g., a result of the user interaction) can be received from the client 102a-c at the server 110.

The clients 102a-102c each comprise a processor 106 and a memory 104. The processor 106 executes program instructions stored in memory 104. The processors 106 may include a microprocessor, ASIC, FPGA, state machines, etc. The memory 104 may include, but is not limited to, electronic, optical, magnetic, or any other storage or transmission device capable of providing a processor with program instructions. The memory 104 may further include a floppy disk, CD-ROM, DVD, magnetic disk, memory chip, ASIC, FPGA, ROM, RAM, EEPROM, EPROM, flash memory, optical media, or any other suitable memory from which a processor can read instructions. The instructions may include code from any suitable computer-programming language, such as, but not limited to, C, C++, C#, Go, Java, JavaScript, Perl, Python and Visual Basic.

Clients 102a-102c may also have a number of external or internal devices such as a mouse, a CD-ROM, DVD, a keyboard, a display, or other input or output devices. Examples of clients 102a-102c are personal computers, digital assistants, personal digital assistants, cellular phones, mobile phones, smart phones, pagers, digital tablets, laptop computers, Internet appliances, and other processor-based devices. In general, a client 102a-102c may be any type of processor-based platform that is connected to a network 108 and that interacts with one or more applications. Clients 102a-102c may operate on any operating system capable of supporting a browser or browser-enabled application, such as Linux, Mac OS, Windows etc. The clients 102a-102c shown include, for example, personal computers executing a browser application program such as Apple Computer, Inc.'s Safari, Microsoft Corporation's Internet Explorer, Mozilla's Firefox, Netscape Communication Corporation's Netscape Navigator, and Opera Software's Opera.

As shown in FIG. 1, server 110 is also coupled to the network 108. The server 110 may include a processor 112 and memory 114 executing a search engine 120 application program and a parsing engine 116 application program. Similar to the clients 102a-c, the server 110 shown in FIG. 1 comprises a processor 112 having a memory. The server 110 may be implemented as a network of computer processors. In some implementations, the server 110 may be multiple servers, mainframe computers, networked computers, a processor-based device, and similar types of systems and devices.

The server 110 may include a search engine system ("search engine"). In some implementations, the search engine may include multiple systems, including, but not limited to, a crawler to retrieve data, a processor, an index engine, and an interface to receive data from the index engine to format and provide the data to a client. In some implementations, the server 110 can include a related information server, advertising server, etc. The server 110 can access the network 108 to receive a query requesting a universal resource locators relating to the query from other devices or systems connected to the network 108.

Memory 114 contains the search engine 120. The search engine 120 can locate relevant information from the network 108 in response to a search query from a user. The query may include a plurality of keywords. The query may also include one or more images and keywords that are based on the image. The search engine 120 may also maintain a search log of the search queries. The search engine 120 may provide a search result set to a user via the network 108.

In some implementations, the server 110 may communicate with the network 108 to access a database 122. The database 122 may include tokens. The tokens may be a word, a proper name, a geographic name, an abbreviation, an acronym, a stock market ticker symbol, or other tokens. The token database 122 generates a character stream that can be parsed by the parsing engine 116.

Memory 114 also contains a parsing engine 116 application program ("parsing engine"). In some implementations, the parsing engine 116 may contain a parsing processor 118. The parsing processor 118 may include parsing logic. The parsing processor 118 may parse the query based on parsing criteria in order to determine the keywords for the query. In other implementations, the processor 112 may include parsing software or hardware configured to parse the query. The server 110 can be configured to generate a result that includes a universal resource locator based on the query. The server 110 can be configured to identify a plurality of words in the universal resource locator. The server 110 can be configured to insert space or whitespace between at least two of the plurality of words. The space can be in addition to a single space character between a plurality of words. When provided in the middle of a URL, the space can be between words which otherwise do not have a space character between them in the URL. The server 110 can be configured to generate display data including the result having the plurality of words and the inserted space therebetween.

When the result is displayed, the keywords located in a text of the universal resource locator has whitespace inserted between the keywords. In some implementations, the whitespace between the keywords is not a space character because inserting a space character does not allow the URL to be copied or pasted. In some implementations, several characters, strings, etc. are separated instead of inserting whitespace. The results may include HTML. In some implementations, the results are displayed in any markup language. The HTML tag that creates the whitespace is inserted between the keywords by the server 110 before the webpage is sent to the client 102. The results may be displayed with at least 0.01 em of whitespace between the keywords. In some implementations, the results may be displayed with at least 0.1 em of whitespace between the keywords. In other implementations, the results may be displayed with at least 0.25 em of whitespace between keywords. One em is equivalent to the vertical space needed for any given letter in a font, regardless of the horizontal space that occupies it. In some implementations, the default font size of a web browser may be 16 px. For example, then 1 em is equal to 16 px; 0.5 em is equal to 8 pxm, 5 em is equal to 80 px. In some implementations, an italics tag with a right margin of 0.25 em can be used to insert additional whitespace. In some implementations, span tag may be used. In some implementations, a div tag may be used. In some implementations, the height of the font may be greater than 0.25 em. The height of the font may correlate to any font used in a web browser.

The results may be displayed with at least 4 pixels of whitespace between the keywords, or in alternative embodiments with at least 0.25 pixel, 0.5 pixel, 1 pixel, at least 2 pixels, less than 6 pixels, etc. The results may be displayed with at least 4 pixels of whitespace between the keywords, or in alternative embodiments with at least 0.25 pixel, 0.5 pixel, 1 pixel, at least 2 pixels, less than 6 pixels, etc. In one embodiment, the server device 110 provides a web page with information relating to the key word that is to be parsed (e.g., the keyword or keywords to parse, a desired visual setting to emphasize the keyword or keywords on the screen such as bolding or adding whitespace, etc.). The web page may receive the information and may be configured to add, for example, pixels of whitespace between the keywords. The web page may automatically add a set number of pixels (e.g., 4 pixels), or may use the information from server device 110 to determine an optimal number of whitespace pixels to insert between keywords. According to another embodiment, the server device 110 may provide the web page with a desired number of whitespace pixels to insert between keywords, or may determine an optimal number of whitespace pixels (e.g., if the server device 110 knows display information related to the web page, the server device 110 may be able to determine an optimal setting).

In one implementation, the whitespace is inserted using a computer language that expresses the presentation of documents, such as structured document. The computer language may be a style sheet language, such as Cascade Style Sheet (CSS) markup enhanced tags. In some implementations, the whitespace is inserted based on spacing identified in the query request. For example, if the user enters "apple orchard," then the whitespace of the selectable link may be similarly spaced. In some implementations, the search engine, parsing processor or other hardware/software implementations may insert whitespace based on proper nomenclature of terms. For example, Google's spell correction has some knowledge of the proper spacing of terms. The proper nomenclature of terms may be determined by looking for high co-ocurrence of related terms. Then, segmentation may occur to increase the total co-occurrence by selecting a sequence with spaces that match.

[inventors: is there a commercially available database or technology that can be used to identify nomenclature based on a string of text? If so, please identify.] For example, if the user enters a run-on term, the whitespace of the selectable link may automatically correct the run-on term.

Figure 2:
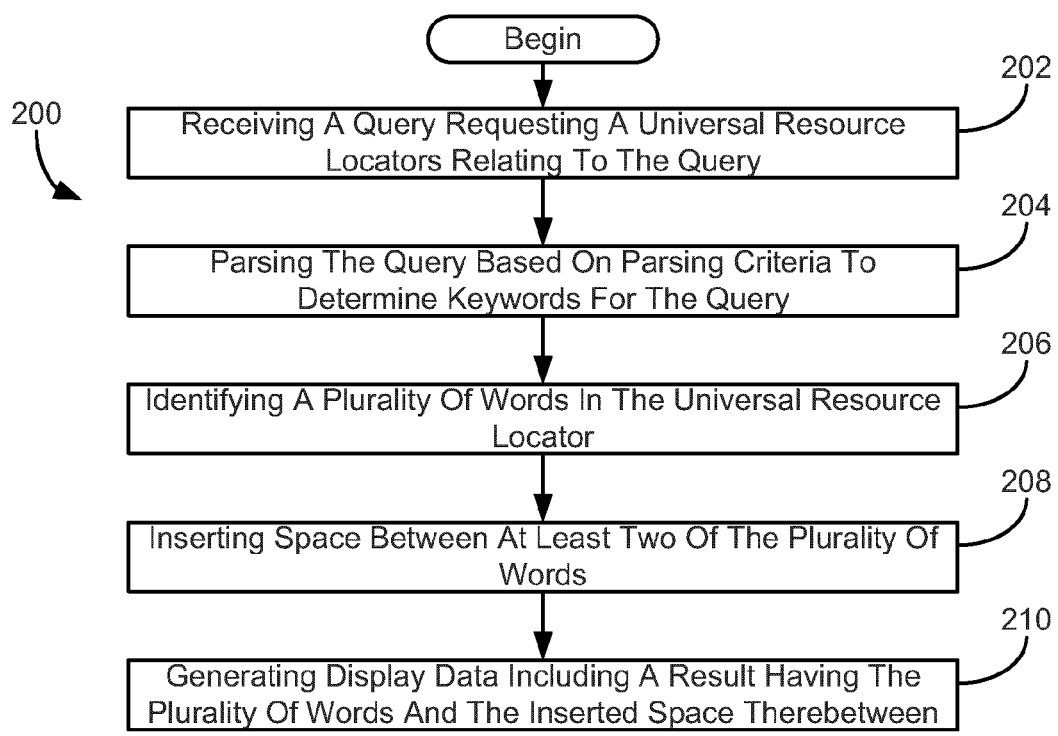
FIG. 2 is a flow diagram of a method in accordance with a described implementation.

Referring to FIG. 2, a flow diagram of a method 200 in accordance with a described implementation is shown. The method 200 is provided by way of example, as there are a number of ways to carry out the methods according to the present disclosure. The method 200 shown in FIG. 2 can be executed or otherwise performed by one or by a combination of various systems. The method may be implemented by a computer, a computer program, a client, a server, a client-server relationship, etc. The method 200 is described herein as carried out by the system 100 of FIG. 1 by way of example.

The example method begins at block 202, in which a query requesting a universal resource locator relating to the query is received by a server. The query can be received by or accessed by server 110 connected to the network 108. In one implementation, the query can include a plurality of keywords. In another implementation, the query can include at least one image and keywords based on the image.

Block 202 is followed by block 204, in which keywords are determined for the query by parsing the query based on parsing criteria. In one implementation, the parsing processor 118 can use one or more criteria to determine the parsing criteria. For example, the parsing criteria may be parsing the characters in the string into a combination of tokens. In some implementations, the parsing criteria may be based on dictionaries, context-free grammar, attribute grammar, S-attributed grammar, etc. In other implementations, the keywords may be determined by searching for spaces in the search string and separating the words of the search string based on the spaces which are found.

Block 204 is followed by block 206, in which a plurality of words is identified in the universal resource locator. In some implementations, the plurality of words may include symbols, numbers, etc.

Block 206 is followed by block 208, in which a space is inserted between at least two of the plurality of words.

Block 208 is followed by block 210, in which display data is generated including a result having the plurality of words and inserted space therebetween. In some implementations, multiple results are generated. In some implementations, the result is generated by a search performed by the search engine 120 in conjunction with the parsing processor 118. In other implementations, the parsing processor 118 can pass the parsed query to the search engine to generate the result.

Figure 3:
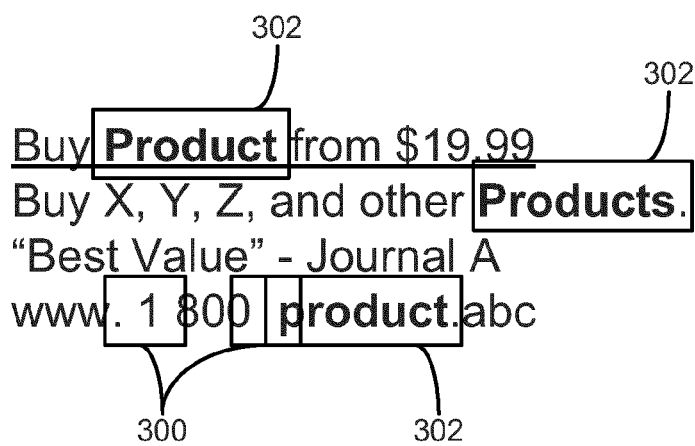
FIG. 3 illustrates a search result with whitespace and bolding in accordance with a described implementation.

Referring to FIG. 3, a search result with whitespace 300 and bolding 302 in accordance with a described implementation is shown. In some implementations, the whitespace 300 is provided by an additional amount of HTML, i.e., a tag is inserted between letters, characters, strings, sentences, numbers, etc. Whitespace is used to indicate spacing between textual and/or graphical characters, and includes spacing of other colors besides white. In some implementations, the whitespace 300 is provided by Cascading Style Sheets (CSS). The CSS may add whitespace 300 by specifying a margin-right value to the one or more tags. The enhanced tags may include an span tag. In some implementations, the enhanced tags may include a div tag. In yet further implementations, the enhanced tags may include an italics tag. The CSS may add a plurality of (e.g., four) pixels near bolded terms 302, in the universal resource locators between bolded terms 302, before a bolded term 302 that is not at a component boundary (e.g., potential leading slash/periods in the domain name), or after a bolded term that is not at a component boundary (e.g., periods and colons in the domain name).

As shown in FIG. 3, the universal resource locator in the results includes a hyperlink or selectable link with whitespace 300 between the keywords. The universal resource locators may also be copy and pasted. The copy and paste functionality is preserved. For example, if the universal resource locators are used to direct a user to a website, the user can copy and paste the URL into the web browser.

Figure 4:
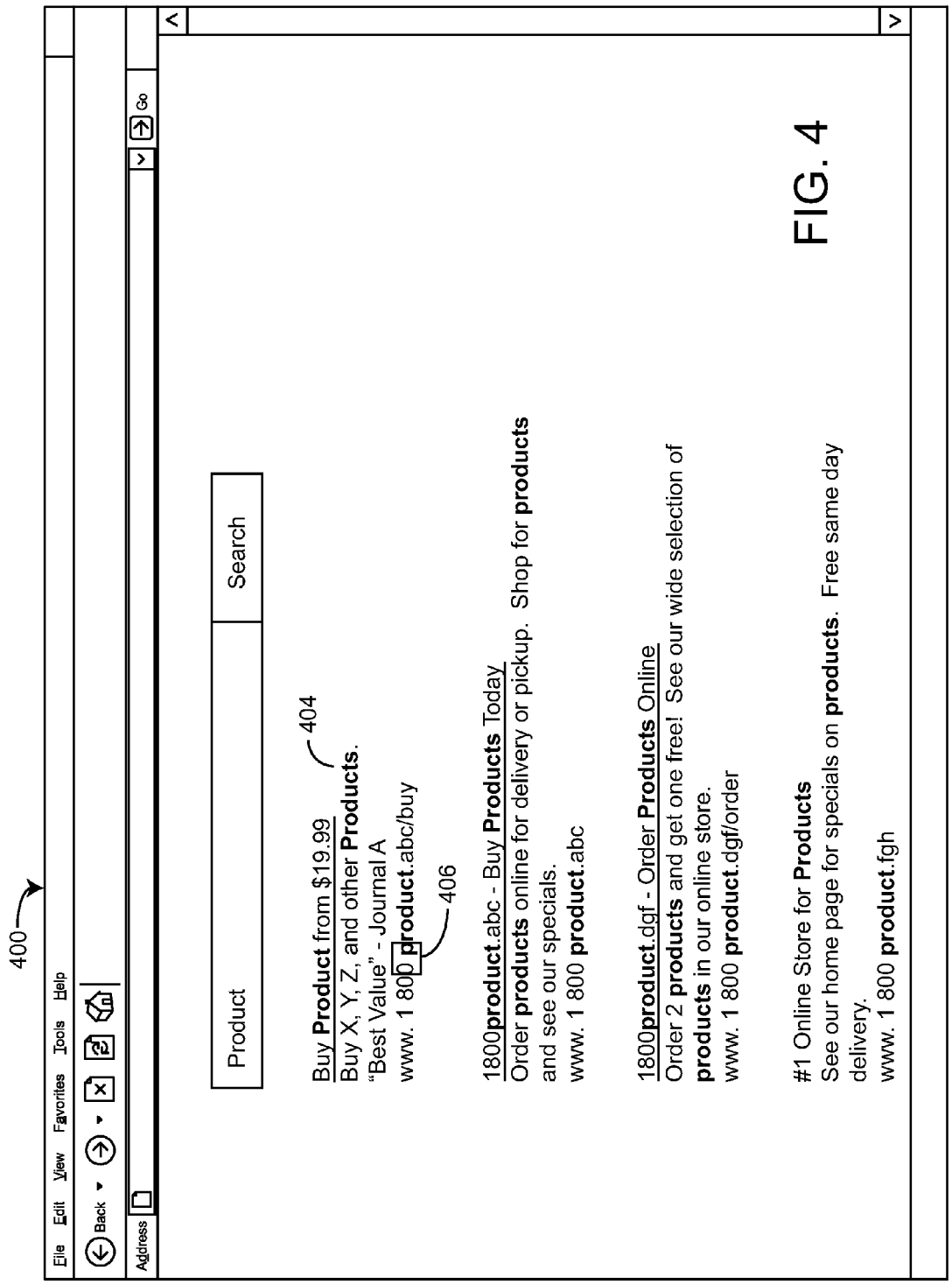
FIG. 4 illustrates a search result with bolding and whitespace within a web browser in accordance with a described implementation.

Referring to FIG. 4, a search result with bolding 404 and added whitespace 406 within a web browser 400 is shown in accordance with a described implementation. In some implementations, CSS-enhanced tags are added between the bolded terms 404 to display whitespace between words. For example, "#tads cite i" can be used to add space to a webpage written in HTML. In another implementation, the spaces can be coded within the HTML. For example, "<i></i>" can be used within the HTML code to add the whitespace. In some implementations, the right margin may be enhanced within HTML using "{margin-right:.25 em}." In some implementations, the left margin, max-width, width headers, footers, etc. may be enhanced by the use of whitespace.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a server computer configured to receive a search query from a client device, the search query comprising a text string;
   a parsing logic configured to parse the search query using parsing criteria based on one or more dictionaries to determine keywords associated with the search query, wherein the keywords associated with the search query include one or more portions of the text string;
   the server computer configured to search a database using the keywords associated with the search query and obtain a search result that includes a universal resource locator, wherein the server computer is configured to identify a plurality of the keywords in the universal resource locator, to modify the universal resource locator by inserting previously non-existing space between at least two of the plurality of identified keywords in the universal resource locator, to generate display data comprising the modified universal resource locator having the plurality of identified keywords and the inserted space therebetween, and to send the display data to the client device;

wherein the server computer inserts the space in the universal resource locator by inserting a HTML tag between characters of the universal resource locator before sending the display data to the client device, wherein the HTML tag comprises at least one of a div tag, an italics tag, and a span tag.

2. The system of claim 1, wherein the search query comprises at least one image and the keywords are based on the image.

3. The system of claim 1, wherein the space is not a space character.

4. The system of claim 1, wherein the display data comprises at least 0.1 em of whitespace between the keywords.

5. The system of claim 1, wherein the display data comprises at least 0.5 pixel of whitespace between the keywords.

6. The system of claim 1, wherein the display data comprises at least 0.01 em of whitespace between the keywords.

7. The system of claim 1, wherein the display data comprises at least 0.25 pixel of whitespace between the keywords.

8. The system of claim 1, wherein the display data is configured to display selectable characters which can be pasted into a web browser.

9. The system of claim 1, wherein the space is inserted using Cascade Style Sheet markup enhanced tags.

10. The system of claim 1, wherein the universal resource identifier includes one or more of the determined keywords, wherein modifying the universal resource locator further includes bolding a keyword in the universal resource identifier, and wherein the space is inserted adjacent to bolded keywords.

11. A computer-implemented method comprising:
receiving a search query at a processing circuit from a client device, the search query comprising a text string;
parsing the search query at the processing circuit using parsing criteria based on one or more dictionaries to determine keywords associated with the search query, wherein the keywords associated with the search query include one or more portions of the text string
searching a database using the keywords associated with the search query to obtain a search result comprising a universal resource locator;
identifying a plurality of the keywords in the universal resource locator;
modifying the universal resource locator by inserting previously non-existing space between at least two of the plurality of identified keywords in the universal resource locator;
generating display data comprising the modified universal resource locator having the plurality of identified keywords and the inserted space therebetween; and
sending the display data to the client device;

wherein inserting the space in the universal resource locator comprises inserting a HTML tar between characters of the universal resource locator before sending the display data to the client device, wherein the HTML tag comprises at least one of a div tag, an italics tag, and a span tag.

12. The method of claim 11, wherein the search query comprises at least one image and the keywords are based on the image.

13. The method of claim 11, wherein the space is not a space character.

14. The method of claim 11, wherein the display data comprises at least 0.1 em of whitespace between the keywords.

15. The method of claim 11, wherein the display data comprises at least 0.5 pixel of whitespace between the keywords.

16. The method of claim 11, wherein the display data comprises at least 0.01 em of whitespace between the keywords.

17. The method of claim 11, wherein the display data comprises at least 0.25 pixel of whitespace between the keywords.

18. The method of claim 11, wherein the display data comprises a hyperlink or selectable link and whitespace between keywords.

19. The method of claim 11, wherein the display data comprises selectable characters which can be pasted into a web browser.

20. The method of claim 11, wherein the space is inserted using Cascade Style Sheet markup enhanced tags.

21. The method of claim 11, wherein the universal resource identifier includes one or more of the determined keywords, wherein modifying the universal resource locator further includes bolding a keyword in the universal resource identifier, and wherein the space is inserted adjacent to bolded keywords.

22. A method for formatting a search result, comprising:
receiving a search query at a server computer from a client device, the search query comprising a text string;
identifying at least one search result using the search query, wherein the search result comprises a resource identifier;
identifying a plurality of keywords in the resource identifier having no space character therebetween;
modifying the resource identifier by inserting previously non-existing space between the plurality of identified keywords in the resource identifier;
generating display data comprising the modified resource identifier having the space inserted between the identified keywords: and
sending the display data to the client device;
wherein inserting the space in the universal resource locator comprises inserting a HTML tag between characters of the universal resource locator before sending the display data to the client device, wherein the HTML tag comprises at least one of a div tag, an italics tag, and a span tag.

* * * * *